No. 616,635. Patented Dec. 27, 1898.
F. H. RICHARDS.
WEIGHING MACHINE.
(Application filed Mar. 4, 1898.)
(No Model.) 8 Sheets—Sheet 1.

Fig. 1.

Witnesses:
F. T. Hewitt
Fred. J. Dole

Inventor:
F. H. Richards

No. 616,635. Patented Dec. 27, 1898.
F. H. RICHARDS.
WEIGHING MACHINE.
(Application filed Mar. 4, 1898.)
(No Model.) 8 Sheets—Sheet 2.

Witnesses: Inventor:

No. 616,635. Patented Dec. 27, 1898.
F. H. RICHARDS.
WEIGHING MACHINE.
(Application filed Mar. 4, 1898.)

(No Model.) 8 Sheets—Sheet 4.

Fig. 4.

Witnesses:
F. G. Hewitt
Fred. J. Dole.

Inventor:
F. H. Richards

No. 616,635. Patented Dec. 27, 1898.
F. H. RICHARDS.
WEIGHING MACHINE.
(Application filed Mar. 4, 1898.)
(No Model.) 8 Sheets—Sheet 5.

Fig. 5.

Witnesses:
F. G. Hewitt
Fred. J. Dole.

Inventor:
F. H. Richards

No. 616,635. Patented Dec. 27, 1898.
F. H. RICHARDS.
WEIGHING MACHINE.
(Application filed Mar. 4, 1898.)

(No Model.) 8 Sheets—Sheet 6.

Witnesses:
F. G. Hewitt
Fred. J. Dole.

Inventor:
F. H. Richards.

No. 616,635. Patented Dec. 27, 1898.
F. H. RICHARDS.
WEIGHING MACHINE.
(Application filed Mar. 4, 1898.)

(No Model.) 8 Sheets—Sheet 7.

Witnesses:
F. H. Hewitt
Fred. J. Dole.

Inventor:
F. H. Richards

No. 616,635. Patented Dec. 27, 1898.
F. H. RICHARDS.
WEIGHING MACHINE.
(Application filed Mar. 4, 1898.)
(No Model.) 8 Sheets—Sheet 8.

Witnesses:
F. G. Hewitt,
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 616,635, dated December 27, 1898.

Application filed March 4, 1898. Serial No. 672,592. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and the object of the invention is to provide certain improvements especially adapted to the type of weighing-machine disclosed by Letters Patent No. 572,067, granted to me November 24, 1896, and the improved machine involves a series of weighing mechanisms alternately dischargeable and certain safety devices for insuring the operation of the several parts of the machine in regular order.

In a contemporaneously-pending application, Serial No. 644,838, filed by me July 16, 1897, there is represented a series of weighing mechanisms each involving a load-receiver to which overloads of material are supplied and from which the surplus is respectively withdrawn before the discharge of the predetermined or true load, the surplus from one load-receiver being delivered into the other, and vice versa, and my present machine is in the nature of an improvement upon the machine covered by said prior application.

In the drawings accompanying and forming part of this specification.

Similar characters designate like parts in all the figures of the drawings.

The framework for supporting the different parts of the machine consists, preferably, of the chambered base 2, the side frames 3 and 4, rising therefrom, and the brackets 5 and 6, extending oppositely from the supply-hopper H, constituting a convenient means for overloading the load-receivers of the weighing mechanisms.

My improved weighing-machine involves a plurality of weighing mechanisms, as W and W', each including a load-receiver, (designated, respectively, by G and G',) and to these load-receivers overloads of material are supplied from the spouts 7 and 7' of the hopper H, the surplus from the load-receiver G being delivered into the load-receiver G', while the surplus from the latter is delivered into the other load-receiver, and the load-receivers are alternately dischargeable, the supply and discharge mechanisms for the load-receivers being controlled by a suitable interlocking stop mechanism, as will hereinafter appear.

The load-receivers G and G' are mounted upon the scale-beams B and B', respectively, which in turn are supported upon the base 2, and these features of construction are substantially the same as illustrated in the Letters Patent to which I have hereinbefore referred, and said load-receivers are also guided during their ascending and descending movements by means of ordinary connections with the framework—such as are shown, for example, in Letters Patent No. 548,845, granted to me October 29, 1895, to which reference may be had.

The load-discharge-controlling means in each weighing mechanism includes a closer, (designated by L and L', respectively,) and as the two parts are similarly mounted I will describe but one of the closer mechanisms in detail, corresponding parts in the other being designated by similar characters with prime-marks.

The closer L is pivoted, as at 12, to the load-receiver G and is counterweighted, as at 13, the counterweight serving to shut the closer on the discharge of a load, and it is held shut by means involving a latch, as 15, pivoted at 16 to the load-receiver, the arm 17 of said latch being of sufficient weight to throw said latch into engagement with the arm 18 of the rocker 19, fixed to the rock-shaft 20 upon the load-receiver and to which the rod 21 is pivoted, said rod being jointed to the closer L.

The rock-shaft 20 carries at its opposite end a crank-arm 22, to which the rod 23 is pivoted, said rod being similarly connected with the closer and movable in parallelism with the rod 21.

Overloads are supplied to the load-receivers G and G' from the hopper H through the spouts 7 and 7', respectively, the streams issuing from the spouts being controlled by stream-controllers or valves V and V'.

I will describe the mounting and actuating means for the valve V, and as these features are the same in the case of the valve V' corresponding parts in the latter will be denoted by similar characters with prime-marks.

The valve V is of the "pan" type, and it has the lateral projections 30 and 31, pivotally supported between the arms 32 and 33 of the uprights 3 and 4, the projection 30 being provided with a rearwardly-extending arm 34, having a valve-closing weight 35, which tends normally to close the valve V or swing the same under the outlet of the spout 7.

A controlling-rod is shown at 36, pivoted to the weight 34 and the free end thereof bearing against the projection or antifriction-roll 37 on the actuator A, pivoted, as at 38, at the poising or inner end of the beam B and connected with the framework by the usual guiding means, as shown, for example, in Letters Patent No. 548,840, granted to me October 29, 1895.

The actuator A forms practically a fixed extension of the beam B, and as the poising ends of these two parts descend the projection 37 will move away from the rod 36, thereby permitting the weight 35 to drop, and consequently shut the valve V, the closure of the valve being completed when the load-receiver G is overloaded. On the return movement of the actuator A it imparts an upward thrust to the rod 31, which is communicated to the valve V for swinging the same from under the outlet of the spout 7, so as to permit the supply-stream from said spout to enter the empty load-receiver.

When the load-receiver G is overloaded, it is caused to descend to the limit of its movement, and at the close of the overloading period the load-reducing means are started in operation to effect the withdrawal of the surplus, which is discharged into the load-receiver G', and the same operation takes place with the latter, except that the surplus therefrom is directed into the load-receiver G. The actuator for effecting the operation of the load-reducing means is preferably operative with the valve V, constituting a part of the overloading means, and the load-reducing means preferably includes a valve 40, pivotally supported, as at 41, in the spout 42 on the side of and communicating with the load-receiver, said load-reducing valve being operated by a member supported upon the load-receiver independently of the primary actuator and operative with the valve V.

The primary actuator is designated by C, and it is in the nature of a by-pass device consisting of two sections 43 and 44, connected by a knuckle-joint 45, the actuator-section 43 being fixed to the valve projection 31, while the section 44 thereof is adapted, when the valve V has nearly reached the end of its working movement, to strike the secondary actuator D, at which time said secondary actuator serves to swing the auxiliary valve 40 open, where it is latched, thereby to permit the surplus to gravitate from the load-receiver G.

The secondary actuator D consists of a gravitative lever pivoted, as at 50, upon the load-receiver and held in its effective position against the pin 51 by the weight 52 at the end of the arm 53, (see Figs. 6 to 10, inclusive,) the arm 54 of said lever having a projection or pin 55, which is adapted to be engaged by the free end of the primary actuator C, so as to operate the load-reducing valve 40.

The working arm 56 of the secondary actuator D carries a by-pass or pawl 57, pivoted thereto, as at 58, and the tailpiece 59 of said pawl being disposed between the stops or pins 60 on the actuator-arm 56.

The load-reducing valve shaft or pivot 41 carries a crank-arm 61, having the projection or pin 62, adapted to be engaged by the secondary actuator D to open the load-reducing valve.

Figure 6:
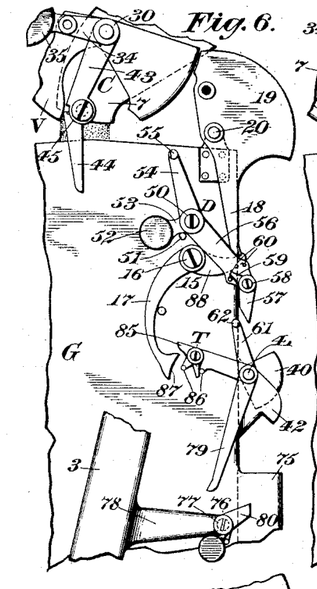
Figs. 6 to 10, inclusive, are diagrammatic views illustrating the action of the load-reducing and load-discharging mechanisms.
Figure 7:
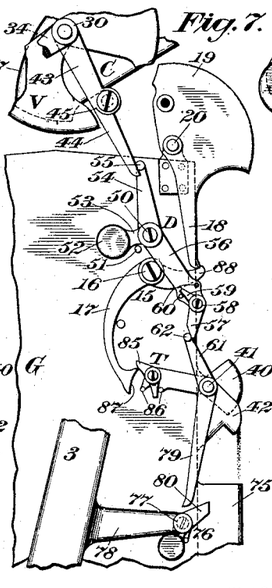
Figure 8:
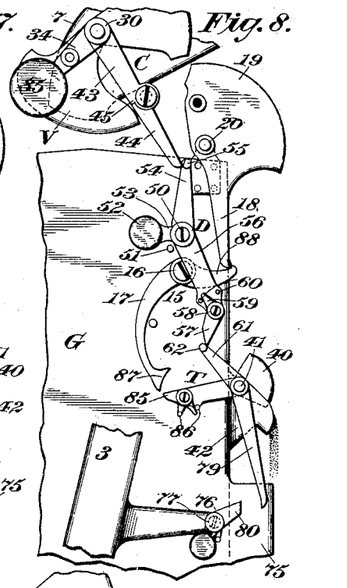
Figure 9:
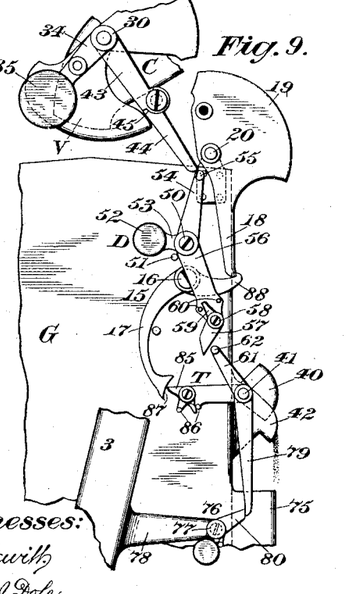
Figure 10:
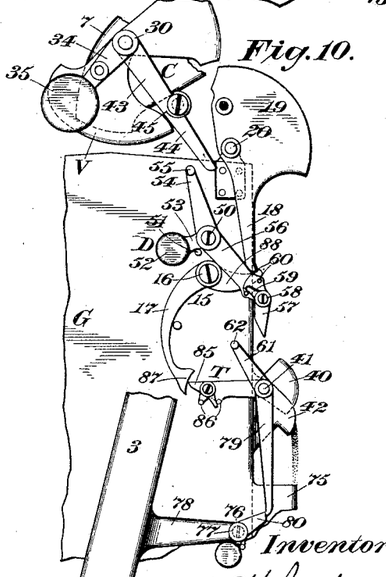

At the commencement of operation, as shown in Fig. 6, the valve V is wide open, the full volume of the supply-stream from the spout 7 entering the empty load-receiver G, and when a certain proportion of the overload has been received the load-receiver will descend, thereby permitting the weight 35 to close the valve V in the manner hereinbefore indicated. When the valve V has nearly reached the end of its cut-off movement, the primary actuator C will strike the pin 55, thereby swinging the arm 56 of the actuator to the left and carrying the by-pass 57 against the actuator-arm 62, as illustrated in Figs. 7 and 8, the by-pass on such movement of the actuator-arm 56 being adapted to operate the valve 40 and passing entirely out of contact with said arm when the overload-valve reaches the limit of its forward movement, as shown in Fig. 9. When the load-reducing valve is opened, as shown in Figs. 8 and 9, the surplus commences to run from the load-receiver G and enters the surplus-receiver hopper 75' on the adjacent side of and communicating with the load-receiver G', the load-receiver G being provided with a similar surplus-receiving hopper 75 to receive the surplus from the load-receiver G'.

When the load-reducing valve 40 is opened, it is prevented from returning immediately to its closed position by means mounted independently of the weighing mechanism, such as a latch 76 of ordinary construction, pivoted, as at 77, to the bracket 78 upon the framework, said latch being adapted to engage the arm 79, fixed to the valve-pivot 41.

When the valve 40 is swung open, the arm 79 will strike and pass the latch-arm 80, as shown in Fig. 8, and as the emptying load-receiver rises the valve-arm 79 will abut against the latch-arm 80, as shown in Fig. 9, to hold the valve 40 open.

When the load-receiver has reached the so-called "poising-line," indicating the complete withdrawal of the surplus, the arm 79 will pass off the latch 76, whereby the valve 40 is released and can shut by its own weight.

The means for effecting the discharge from the load-receiver is preferably operative with the load-reducing means, and it involves, preferably, a tripper, as T, fixed to the shaft or pivot 41 and adapted to engage the weighted arm 17 of the closer-shutting latch 15. The tripper T consists of an arm terminating in a by-pass 85 of the usual construction, the motion of which is limited by stops, as 86, on the fixed portion of the tripper, and the said by-pass is adapted to ride along the curved face 87 at the end of the latch-arm 17, so as to disconnect the arm 88 of said latch from the rocker-arm 18, thereby releasing the closer, which is forced open by the weight of the mass in the load-receiver.

The two weighing mechanisms operate precisely the same and in alternation.

In connection with the valves V and V' and the closers L and L', I provide means for locking the valve V' and the closer L' shut when the valve V' and closer L are open, and vice versa. The projections 30 and 30' of the two valves carry the stops S and S', consisting of arms 90 and 90' and segmental portions 91 and 91' at the ends of said arms, and between said stops is mounted a third stop S'' pivotally suspended, as at 92, from the bracket 5. The intermediate stop S'' is substantially of segmental shape, and it is thrown into position to block one valve by the operation of the other valve, so that both of said valves cannot be simultaneously open.

Figure 1:
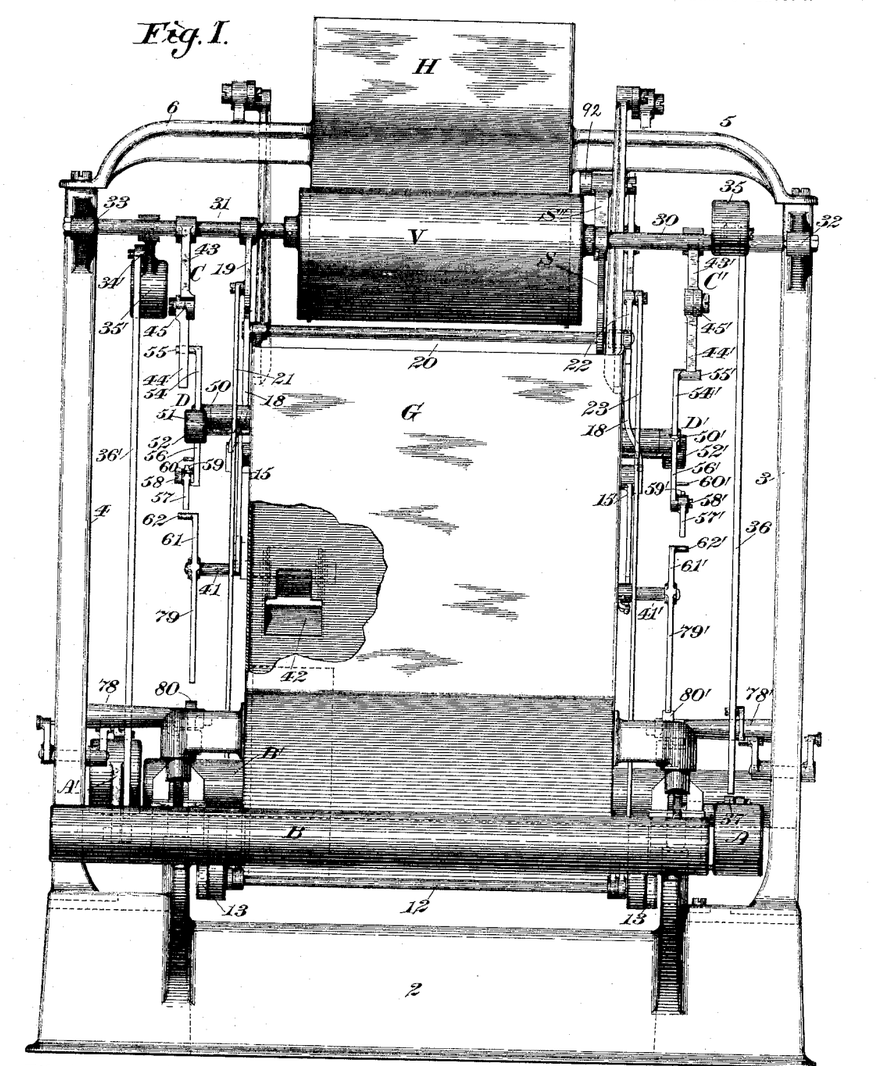
Figure 1 is a front elevation of my improved weighing-machine.
Figure 2:
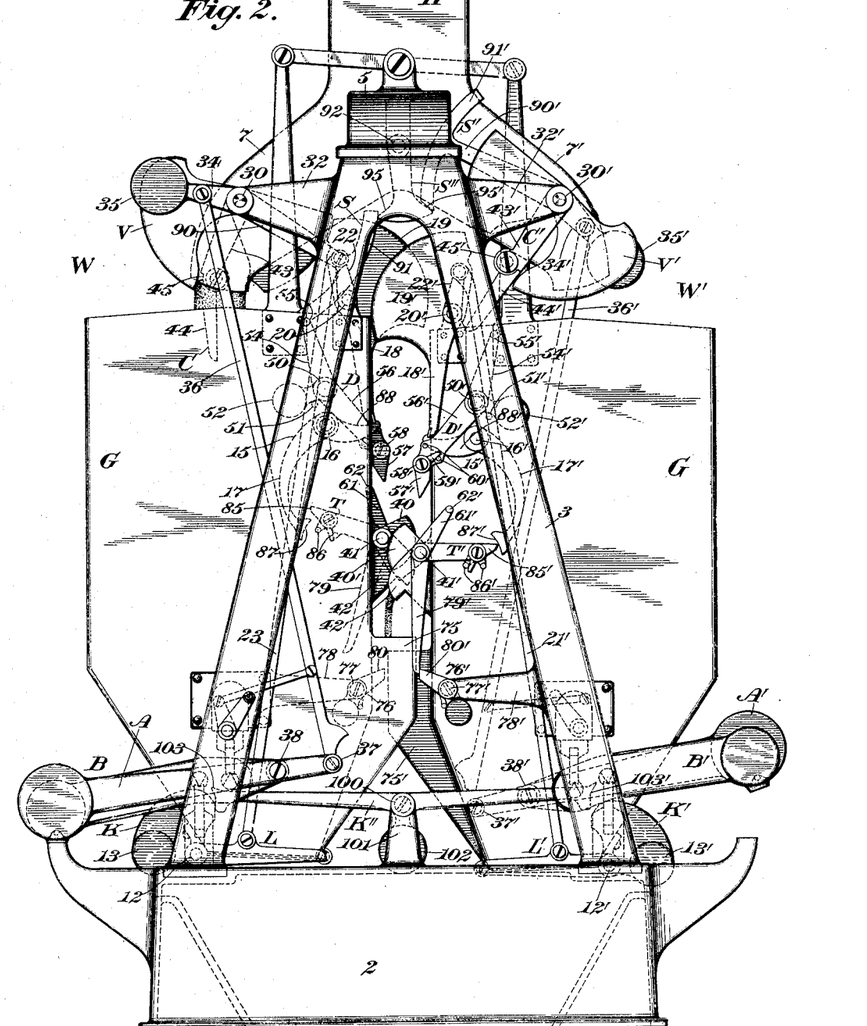
Figs. 2, 3, 4, and 5 are side elevations of the same as seen from the right in Fig. 1, showing the positions occupied by the different parts during the operation of the machine.
Figure 3:
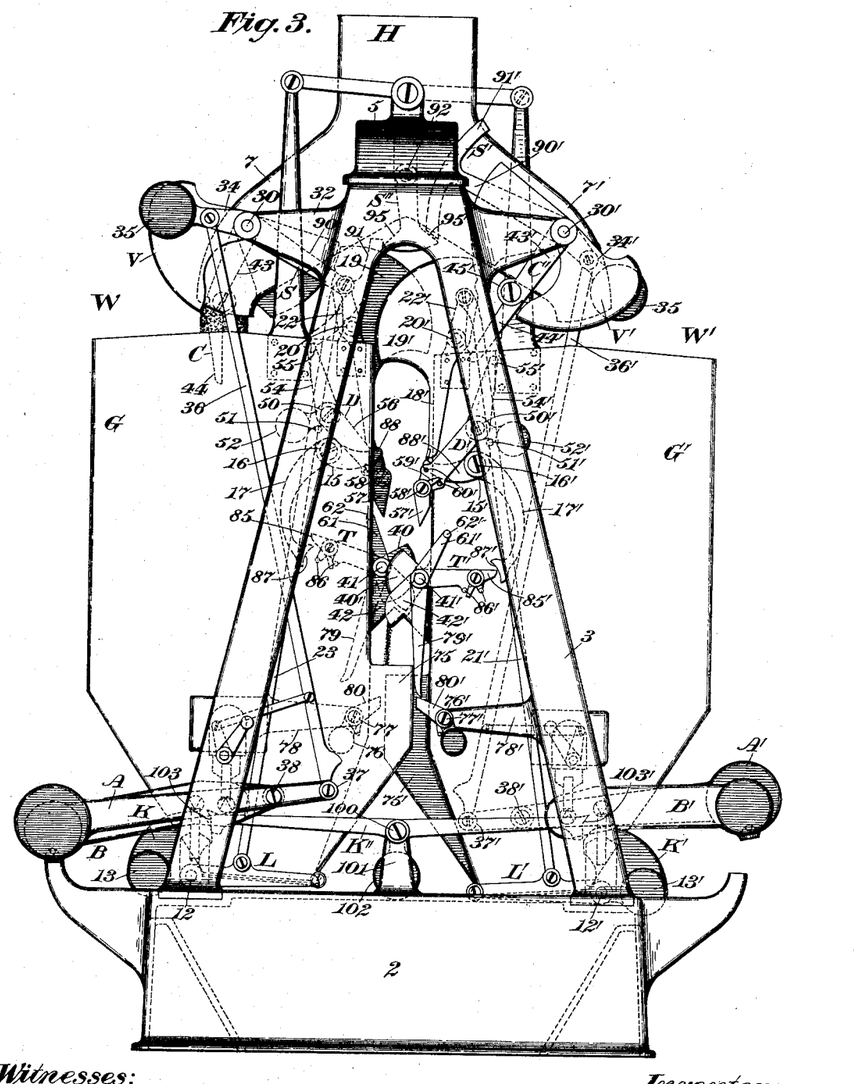
Figure 4:
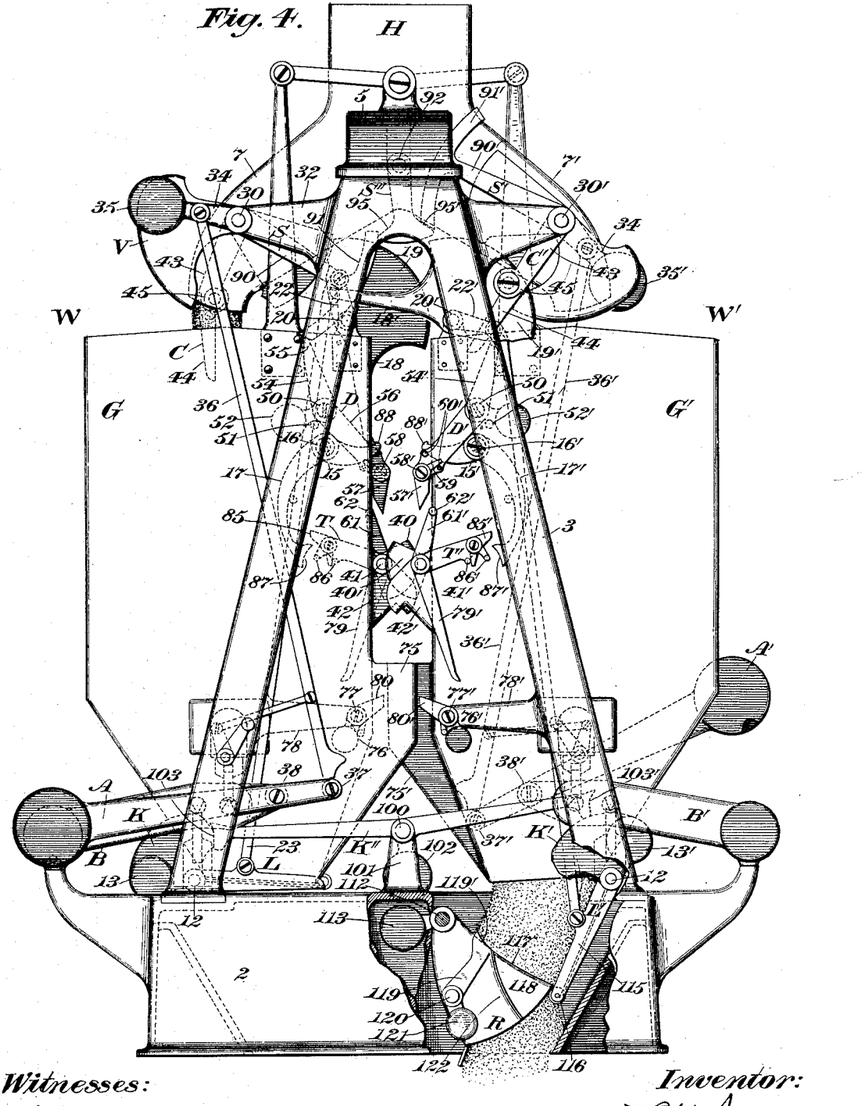
Figure 5:
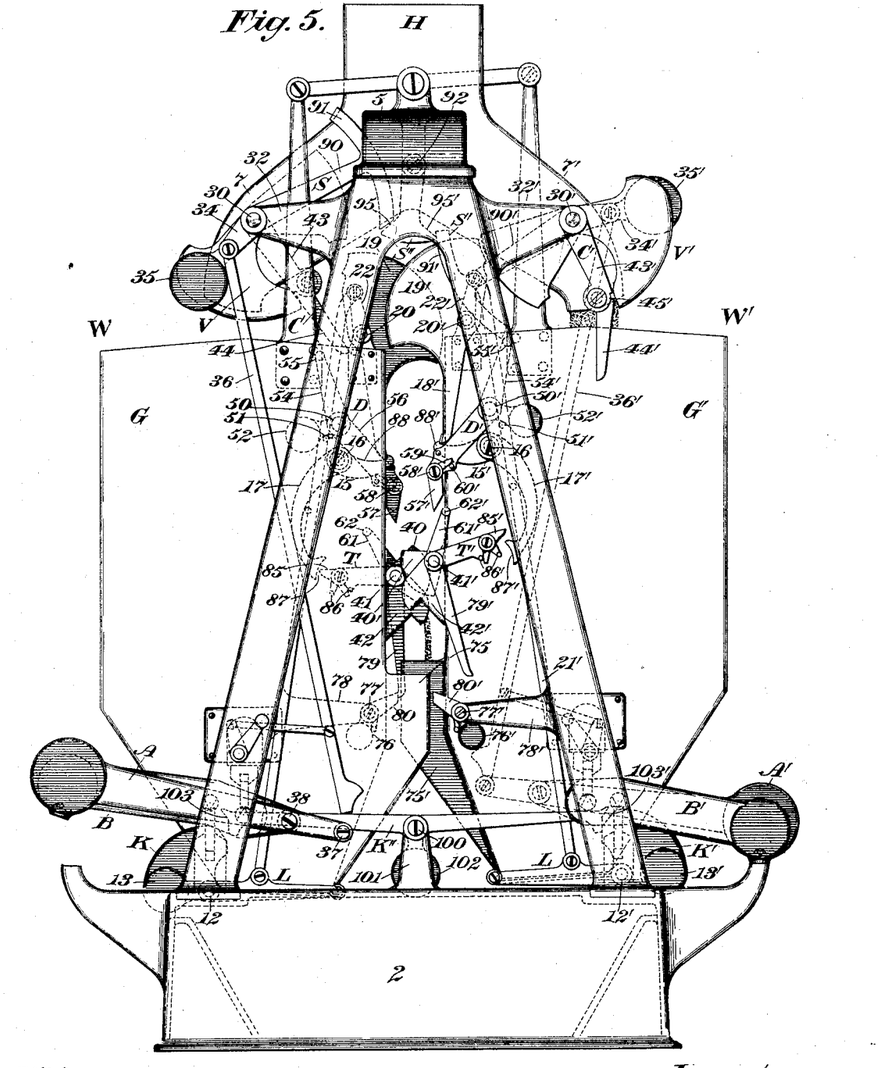

In Fig. 2 the outer face of the segmental portion 91 of the main stop S is in contact with the point of the auxiliary or intermediate stop S'', while the segmental portion 91' of the main stop S' is above and the end thereof is nearly in contact with the oblique or inclined face 95' of the auxiliary stop, the valve V being wide open, while the valve V' is shut, whereby the stop S', and consequently the valve V', are locked against retraction—that is to say, when the load-receiver G' empties the beam B' is free to return to its normal position, but the actuator A' can move but a short distance, or until the stop S' strikes the face 95 of the auxiliary stop S''. When, however, the valve V is shut, as indicated in Fig. 5, the segmental portion 91 of the stop S will move above and its end nearly in contact with the face 95, thereby releasing the auxiliary stop S'', the main stop S', the valve V', and consequently the actuator A', whereby the actuator will drop from the position shown in Fig. 4 to that represented in Fig. 5, and as it does so the rod 36' will be forced upward and the valve V will be swung open and the stop S' will be swung downward, and said stop serves as a cam or operating device to move the face 95 of the auxiliary stop S'' under the main stop, whereby the valve V will be locked and these operations alternate so long as the machine is in action.

I provide a second safety device operative with the closers L and L'. The counterweights 13 and 13' of the closers are provided with substantially cam-shaped stops K and K', with which the auxiliary stop K'' coöperates, the latter being pivoted, as at 100, to the post 101 on the base 2 and having a weight 102, which serves as a balance to hold the stop in its ineffective position. The auxiliary stop K'' terminates in the locking portions 103 and 103' coöperative with the stops K and K', respectively, and adapted to be engaged thereby. When either one of the closers is open, the stop K or K' operative therewith will engage one of the locking portions 103 and 103' and will throw the other of the locking portions across the path of its coöperative stop K or K', thereby to lock a closer. When the closer L opens, the stop K will engage the locking portion 103 and will elevate the same, thereby lowering the locking portion 103' across the path of the coöperating stop K' to prevent the opening of the closer L'. When the closer L is shut, the closer L' of course will be released, and when said closer L' opens the closer L will be locked in the same manner.

In connection with the closers L and L', respectively, I provide closer-blocking regulators to prevent the shutting of said closers until the complete loads are discharged, and I have illustrated but one of the regulators, (see Figs. 11 to 14,) said regulator being designated by R and consisting of a hopper-shaped device pivoted, as at 112, in the base 2 and counterweighted, as at 113, the counterweights serving to return the regulator to its initial or uppermost position when the material has passed from the same. The regulator R is shifted, by means operative with the closer, into position to block said closer.

The closer-supporting shaft or pivot 12' carries a rock-arm 115, having the roll 116 at its free end adapted to ride along a track 117 on the offset or cheek 118 on the side of the regulator, and said roll also travels in contact with the face 119' of the pawl 119, the pawl-face 119' forming a continuation of the track 117. The pawl 119 is pivoted, as at 120, to the regulator and is weighted, as at 121, the weight serving to hold the upper end of said pawl against the inner or reduced end of the offset 118.

Figure 11:
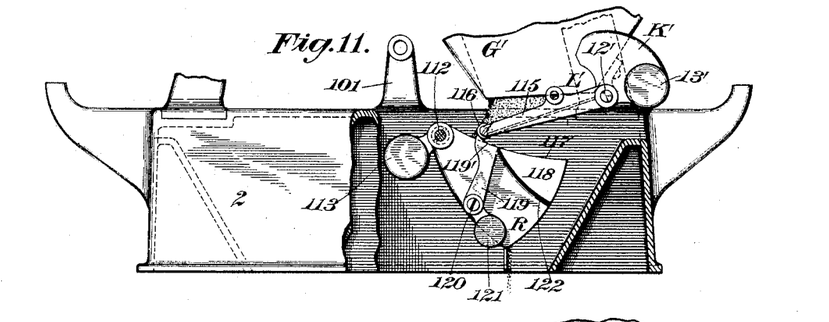
Figs. 11 to 14, inclusive, are sectional side elevations of the base and the lower portion of one of the load-receivers and the closer-blocking regulator.
Figure 12:
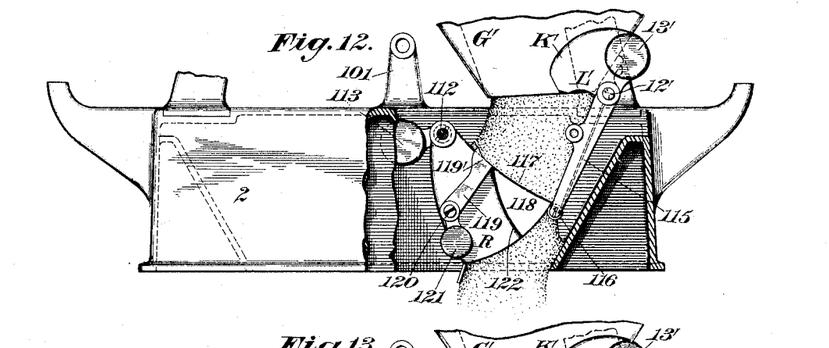

When the closer L is released, the load of material will force the same open until the antifriction-roll 116 abuts against the curved face 119' at the upper end of the pawl 119, as shown in Fig. 11, and on the continuation of the closer movement the roll 116 will ride along the faces 119' and 117' and will lower said regulator to the limit of its movement, and when the roll passes out of contact with the offset 118 the weight 113 will slightly raise the regulator and will move the offset 118 across the path of the roll, thereby blocking the return movement of the closer.

Figure 13:
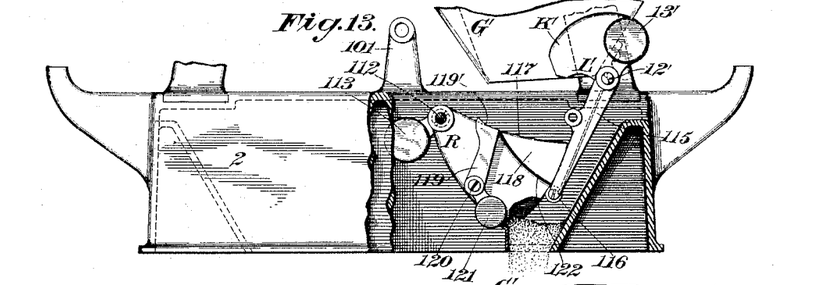
Figure 14:
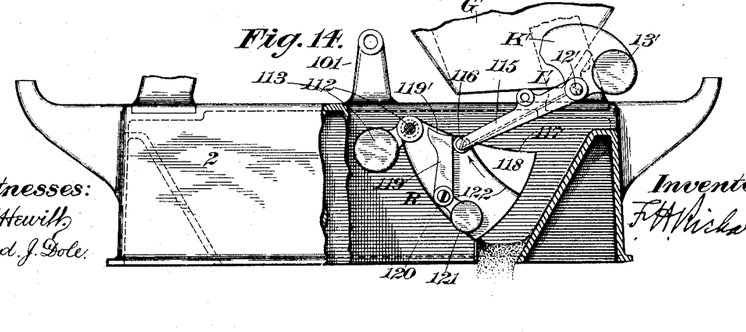
Figure 15:
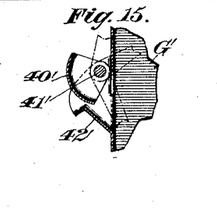
Figs. 15 and 16, Sheet 2, are sectional detail views of load-reducing means.
Figure 16:
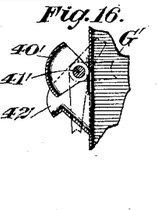

When practically all of the material has passed out of the regulator, said regulator will be elevated, as shown in Figs. 13 and 14, and when the face 122 of the offset 118 is opposite the roll 116 the closer will be released and the weight 13' thereof can return said closer to its shut position, and during this motion the roll 116 will ride along the curved face 122, as shown by the arrow in Fig. 14, and will thrust the pawl to one side, so that the closer can be fully shut, and when the roll passes out of contact with the pawl the latter will be returned to its primary position by the weight 121.

In connection with the supply-valves V and V', I employ the usual interlocking stops, but do not deem it necessary to describe the same in detail, the construction and mode of operation of said stops being clearly illustrated and described in Letters Patent No. 548,840, granted to me October 29, 1895, to which reference may be had.

The operation of the machine is as follows: In Fig. 2 the load-receiver G is receiving the full volume of the supply from the spout 7, while the load-receiver G' has been overloaded and its surplus is being discharged into the load-receiver G. When the surplus is completely withdrawn from the receiver G', the tripper T' thereof will strike the latch 15' and will disengage said latch from the rocker 19', thereby to release the closer L', which opens in the manner hereinbefore described and through the stop K'' locks the closer L. When the load is completely discharged from the receiver G', the latter and the beam B' return to their primary positions, but the actuator A' is locked by the stops S'' in the manner hereinbefore described. When the receiver G is nearly overloaded, it will descend and the load-reducing means will be started in operation to effect the withdrawal of the surplus and deliver the same into the load-receiver G', and the operations of the two weighing mechanisms will alternate.

Figure 17:
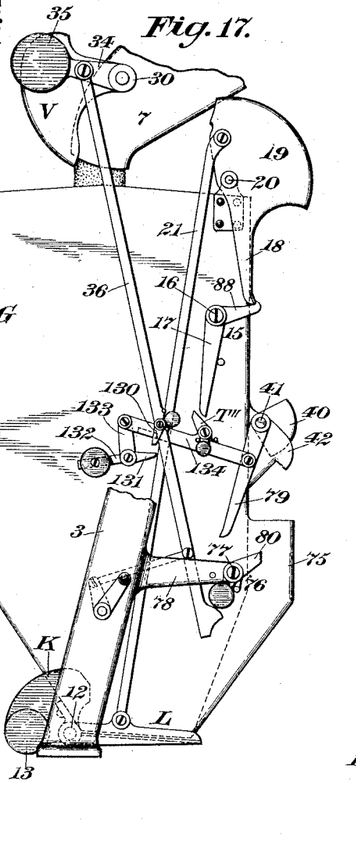
Figs. 17 to 19, inclusive, are detail views illustrating a modification of the load-reducing and load-discharging mechanisms.
Figure 18:
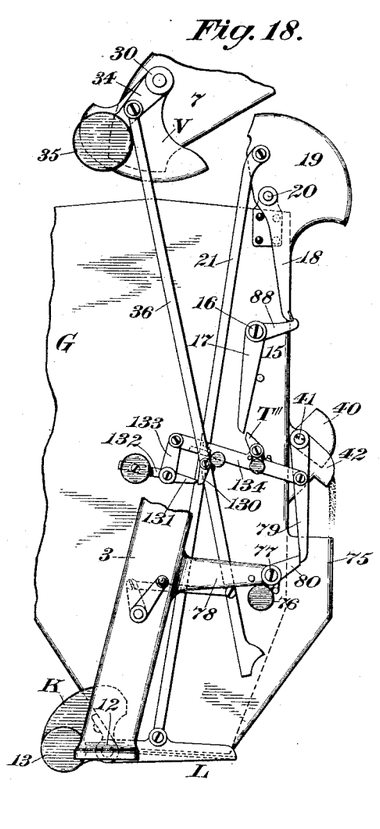
Figure 19:
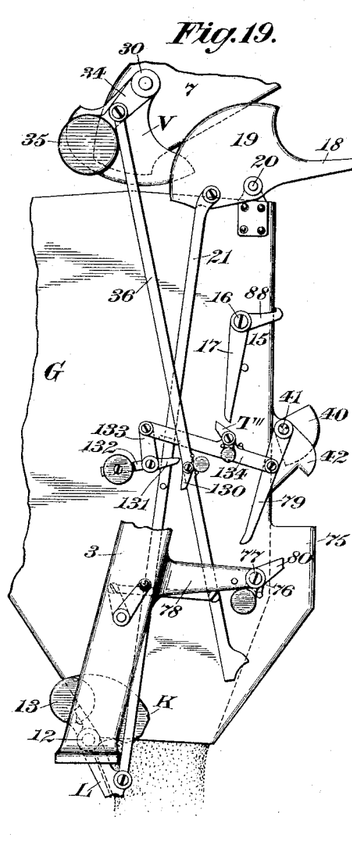

In Figs. 17 and 18 I have illustrated a modification of the means for operating the load-reducing valve, and for tripping the latch from the latter the other parts of the machine with these two exceptions are the same. The thrust-rod 36 carries a by-pass 130, adapted to strike the arm 131 of the three-armed weighted lever 132, the arm 133 of said lever being pivoted to the link 134, which is likewise jointed to the arm 79, so that the by-pass by striking the lever 131 can open the valve 40, as shown in Fig. 18, whereby the arm 79 can be engaged by the latch 76. On the shutting of the valve 40 the by-pass tripper T'' strikes the lower arm of the latch 15 and disengages said arm from the rocker-arm 18 to release the closer L.

Having described my invention, I claim—

1. The combination, with weighing mechanism including a load-receiver and with overloading means for said load-receiver, of load-reducing means; a primary actuator operative with the overloading means; a secondary actuator supported independently of, and adapted to be operated by, the primary actuator before the discharge of the load, said secondary actuator being mounted to operate the load-reducing means; independent mechanism for subsequently effecting the discharge of the true load; and independent weighing mechanism including a load-receiver in position to receive the surplus.

2. The combination, with weighing mechanism including a load-receiver and with overloading means for said load-receiver, of a load-reducing valve; a primary actuator operative with the overloading means; a secondary actuator supported independently of, and adapted to be operated by, the primary actuator before the discharge of the load, said secondary actuator being constructed to operate the load-reducing valve; independent mechanism for subsequently effecting the discharge of the true load; and independent weighing mechanism including a load-receiver in position to receive the surplus.

3. The combination, with weighing mechanism including a load-receiver and with overloading means for said load-receiver, said overloading means including a valve, of load-reducing means; a primary actuator connected with the overloading-valve; a secondary actuator supported independently of, and adapted to be operated by, the primary actuator before the discharge of the load, said secondary actuator being constructed to operate the load-reducing means; and independent mechanism for subsequently effecting the discharge of the true load.

4. The combination, with weighing mechanism including a load-receiver and with overloading means for said load-receiver, of load-reducing means; a primary actuator operative with the overloading means; a secondary actuator supported upon the load-receiver independently of, and adapted to be operated by, the primary actuator before the discharge of the load, said secondary actuator being constructed to operate the load-reducing means; independent mechanism for subsequently effecting the discharge of the true load; and independent weighing mechanism including a load-receiver in position to receive the surplus.

5. The combination, with weighing mechanism including a load-receiver and with overloading means for said load-receiver, of load-reducing means; a primary actuator operative with the overloading means and consisting of two jointed sections; and a secondary actuator in position to be operated by the primary actuator at a predetermined point, said secondary actuator being constructed to operate the load-reducing means.

6. The combination, with weighing mechanism including a load-receiver and with overloading means for said load-receiver, said overloading means including a valve provided with a projection, of load-reducing means; a primary actuator operative with the overloading means and consisting of two jointed sections one of which is fixed to said projection; and a secondary actuator supported independently of, and adapted to be operated by, the primary actuator, said secondary actuator being constructed to operate the load-reducing means.

7. The combination, with weighing mechanism including a load-receiver and with overloading means for said load-receiver, of load-reducing means; a primary actuator operative with the overloading means; a gravitative secondary actuator supported independently of, and adapted to be operated by, the primary actuator before the discharge of the load, said secondary actuator being constructed to operate the load-reducing means; independent mechanism for subsequently effecting the discharge of the true load; and independent weighing mechanism including a load-receiver in position to receive the surplus.

8. The combination, with weighing mechanism including a load-receiver and with overloading means for said load-receiver, of load-reducing means; a primary actuator operative with the overloading means; a secondary actuator supported independently of, and adapted to be operated by, the primary actuator before the discharge of the load, said secondary actuator being constructed to operate the load-reducing means and consisting of a counterweighted lever, independent mechanism for subsequently effecting the discharge of the true load; and independent weighing mechanism including a load-receiver in position to receive the surplus.

9. The combination, with weighing mechanism including a load-receiver and with overloading means for said load-receiver, of load-reducing means; a primary actuator operative with the overloading means; and a secondary actuator supported independently of, and adapted to be operated by, the primary actuator, said secondary actuator being constructed to operate the load-reducing means and having at its operating end a by-pass device.

10. The combination, with weighing mechanism including a load-receiver and with overloading means for said load-receiver, of load-reducing means; a primary actuator operative with the overloading means; a secondary actuator supported independently of, and adapted to be operated by, the primary actuator before the discharge of the load, said secondary actuator being constructed to operate the load-reducing means and consisting of a counterweighted lever pivoted to the load-receiver; independent mechanism for subsequently effecting the discharge of the true load; and independent weighing mechanism including a load-receiver in position to receive the surplus.

11. The combination, with weighing mechanism including a load-receiver and with overloading means for said load-receiver, of load-reducing means; a primary actuator operative with the overloading means; a secondary actuator supported independently of, and adapted to be operated by, the primary actuator, said secondary actuator being constructed to operate the load-reducing means; and means operative with the load-reducing means for effecting the discharge of the predetermined load.

12. The combination, with weighing mechanism including a load-receiver and with overloading means for said load-receiver, of means including a latch for governing the discharge of the load; load-reducing means; a primary actuator operative with the overloading means; a secondary actuator supported independently of, and adapted to be operated by, the primary actuator, said secondary actuator being constructed to operate the load-reducing means; and means operative with the load-reducing means for tripping the said latch.

13. The combination, with weighing mechanism including a load-receiver and with overloading means for said load-receiver, of load-reducing means including a valve; a primary actuator operative with the overloading means; a secondary actuator supported independently of, and adapted to be operated by, the primary actuator, said secondary actuator being constructed to operate the load-reducing means; and means in position to prevent the immediate shutting of the load-reducing valve.

14. The combination, with weighing mechanism including a load-receiver and with overloading means for said load-receiver, of load-reducing means; means including a latch for governing the discharge of the load; a primary actuator operative with the overloading means; a secondary actuator supported independently of, and adapted to be operated by, the primary actuator, said secondary actuator being constructed to operate the load-reducing means; and a latch-tripper connected with the load-reducing means and including a by-pass.

15. The combination, with a series of weighing mechanisms each including a load-receiver, of stream-supplying means; stream-controllers; and a device supported independently of and intermediate to the stream-controllers and in position to be operated by one of them to block the operation of the other.

16. The combination, with a series of weighing mechanisms each including a load-receiver, of stream-supplying means; stream-controllers; and a device supported independently of, and between, the stream-controllers, each of the latter being adapted to operate said device to block the other stream-controller.

17. The combination, with a series of weighing mechanisms each including a load-receiver, of stream-supplying means; stream-controllers; and a device on the framework intermediate to the stream-controllers, each of said stream-controllers being adapted to operate said device to throw it into position to block the other stream-controller.

18. The combination, with a series of weighing mechanisms each involving a load-receiver, of stream-supplying means; stream-controllers; and a pivotally-supported device carried by the framework in position to be operated by one of the stream-controllers and to be thrown in position to block the operation of the other stream-controller.

19. The combination, with a series of weighing mechanisms each including a load-receiver, of stream-supplying means; stream-controllers; stops operative with the stream-controllers; and an intermediate stop pivotally supported on the framework and adapted to coöperate with the other stops.

20. The combination, with a series of weighing mechanisms each including a load-receiver, of stream-supplying means; stream-controllers each having a stop; a coöperative stop pivotally supported between and coöperating with the other stops; load-reducing means for one of the load-receivers; and means for supplying the surplus withdrawn from said load-receiver into the other load-receiver.

21. The combination, with a series of weighing mechanisms each including a load-receiver, of stream-supplying means; stream-controllers each having a stop; and a segmental stop suspended from the framework between the other stops and having block-faces coöperative with said pair of stops.

22. The combination, with a series of weighing mechanisms each including a load-discharger, of an oscillatory stop device supported upon the framework intermediate said load-dischargers and in position to be operated by either of them to block the operation of the other.

23. The combination, with a series of weighing mechanisms each including a load-receiver provided with a closer, of a counterweighted device supported upon the framework intermediate to the closers and in position to be operated by either of the closers to block the action of the other closer.

24. The combination, with a series of weighing mechanisms each including a load-receiver provided with a counterweighted closer, of stops connected with the closers, and an intermediate stop pivotally supported upon the framework intermediate to the other stops and in position to be operated by one of the latter to block the operation of the other.

25. The combination, with weighing mechanism including a load-receiver provided with a closer, of a regulator having a closer-retarding offset, the upper face of which is curved, and said regulator being provided with a pivotally-supported counterweighted pawl, the counterweight serving normally to hold the pawl in contact with the offset, and the upper face of the pawl being curved and forming, in connection with the curved face of the offset, a track; and an arm connected with the closer and adapted to ride along said track to shift the regulator.

26. The combination, with weighing mechanism involving a load-receiver, of a regulator having a closer-retarding offset and provided with a movably-mounted part one face of which forms, in connection with the offset, a track, and a member operative with the closer and adapted to travel along said track.

27. The combination, with weighing mechanism including a load-receiver, of a regulator having a closer-retarding offset and provided with a pivotally-supported pawl one face of which forms, in connection with one face of the offset, a track, and a member operative with the closer and adapted to ride along said track to shift the regulator.

FRANCIS H. RICHARDS.

Witnesses:
F. N. CHASE,
JOHN O. SEIFERT.